United States Patent [19]
Carlson

[11] 3,846,516
[45] Nov. 5, 1974

[54] AERATOR DEVICE AND METHOD
[75] Inventor: Larry W. Carlson, Canoga Park, Calif.
[73] Assignee: Rockwell International Corporation, El Segundo, Calif.
[22] Filed: Sept. 25, 1972
[21] Appl. No.: 293,302

[52] U.S. Cl.................. 261/87, 210/242, 261/91, 261/120
[51] Int. Cl.................................. B01f 3/04
[58] Field of Search............... 261/87, 91, 93, 120; 210/220, 242; 138/44

[56] References Cited
UNITED STATES PATENTS

| | | | |
|---|---|---|---|
| 1,892,906 | 1/1933 | Schnitter | 138/44 |
| 2,094,004 | 9/1937 | Drake | 261/87 |
| 2,293,183 | 8/1942 | Walker | 261/93 |
| 2,966,345 | 12/1960 | Burgoon et al. | 261/93 X |
| 3,092,678 | 6/1963 | Braun | 261/87 X |
| 3,108,146 | 10/1963 | Gross | 261/93 X |
| 3,132,839 | 5/1964 | Haekal | 261/87 X |
| 3,206,176 | 9/1965 | Peterson | 210/220 |
| 3,626,791 | 1/1953 | Lefevre | 261/87 |
| 3,643,403 | 2/1972 | Speece | 261/93 X |

FOREIGN PATENTS OR APPLICATIONS

| | | | |
|---|---|---|---|
| 193,813 | 2/1957 | Austria | 261/87 |

*Primary Examiner*—Tim R. Miles
*Assistant Examiner*—Richard L. Chiesa
*Attorney, Agent, or Firm*—L. Lee Humphries; Robert M. Sperry

[57] ABSTRACT

An aerator device and method of aerating which comprises a hollow-bladed axial impeller means to effect supercavitation below the surface of the liquid and to produce a downward, swirling flow of gas and liquid; means for admitting a flow of gas to and through a first venturi and out through the blades of the propeller; wall means surrounding said blade means for cooperatively forming therewith an effective second venturi adjacent the blades; and means for preventing gas having passed the blades from reentering the blade area before being dissolved in the liquid.

15 Claims, 3 Drawing Figures

AERATOR DEVICE AND METHOD

BACKGROUND OF THE INVENTION

1. Field of the Invention

This invention generally relates to a method and apparatus to mechanically transfer oxygen or other gases into a liquid body; in particular, the invention relates to an aeration method and apparatus for industrial and municipal applications. The inventive apparatus and method may be used, for example, to effect the biological purification of water in a wastewater treatment plant by aeration.

2. State of the Art

Equipment typically employed for accomplishing municipal or industrial aeration of liquid (e.g., wastewater) consists of three general types: (a) air diffusion units comprising a porous media, such as a sintered pipe, through which air escapes into the body of polluted liquid; (b) surface aeration units employing a large rotating brush or impeller at the liquid surface to accomplish oxygen transfer by generating high surface turbulence and liquid spray; and (c) submerged aeration systems in which air is released below the rotating blades of a substantially submerged impeller which shears the rising air into smaller bubbles and which concomitantly distributes the mixture of liquid and entrained air throughout the liquid body. Although the apparatus of the present invention cannot be categorically described as either a submerged or surface aeration device, it does resemble the former more than the latter.

Typical submerged aeration equipment pumps liquid radially but it has been suggested, as in U.S. Pat. No. 2,293,183, to initiate an axially downward flow of liquid. Either the radial or the axial flow agitates the mixture of released air bubbles and polluted liquid. An important consideration in submerged aeration equipment is to provide sufficient detention time of the gas bubbles within the liquid body so the gas dissolves thereinto. The dissolution of oxygen into a liquid is termed oxygen transfer.

It is known that the rate of oxygen transfer (oxygenation rate) is directly proportional to the surface area of air bubbles mixed into a liquid (i.e., to the interfacial area of transfer). In other words, a larger percentage of any given quantity of air is dissolved in a liquid if the size of the air bubbles mixed thereinto is reduced. The effectiveness of an aeration apparatus is as usually expressed in terms of the oxygen transfer efficiency (pounds of oxygen per horsepower-hour).

SUMMARY OF THE INVENTION

In general, the present invention provides improved method and means for aeration. More particularly, the invention resides in a novel impeller and in driving the impeller to supercavitate to effect oxygenation of a liquid. The term aeration as used herein generally denotes the addition of a gas to a liquid and it should be clearly understood that the method and apparatus described herein may be used for other purposes than the addition of air to water. For example, the inventive methods and apparatus may be utilized for pulp bleaching and for the flotation of minerals.

A fixed or floating structure is provided to support drive or power means at the surface of a liquid body. The inventive apparatus includes, inter alia, an axial flow impeller which is disposed below the liquid surface and which is rotated preferably at sufficient speeds by the drive means to produce supercavitation on the impeller and to impart a swirling motion to the liquid to entrain gas bubbles. In the preferred embodiment, the flow induced by the impeller is downward but, for some applications, an upward flow may be utilized. The blades of the impeller are hollow and have at least one opening formed therein, preferably at the trailing edge. Means are provided to draw air from above the liquid surface and to release the air into the hollow blades wherefrom the air is aspirated out the opening or open trailing edges.

In one embodiment, the inventive apparatus includes a skirt formed as a venturi element which depends from the float means to surround the impeller. The venturi inlet is spaced below the float and the float bottom may have a configuration which allows a smooth liquid flow into the venturi inlet. The venturi throat is adjacent the impeller. The venturi outlet extends to a sufficient depth in the liquid to assure recapture of the dynamic fluid pressure generated by the impeller and to allow a relatively complete dissolution of the gas into the liquid before it exists from the skirt area.

BRIEF DESCRIPTION OF THE DRAWINGS

The invention may be further understood by referring to to following description and appended drawings which are offered by way of illustration and not in limitation of the invention, the scope of which is defined by the appended claims and equivalents.

In The Drawings

DESCRIPTION OF THE PREFERRED EMBODIMENTS

Figure 1:
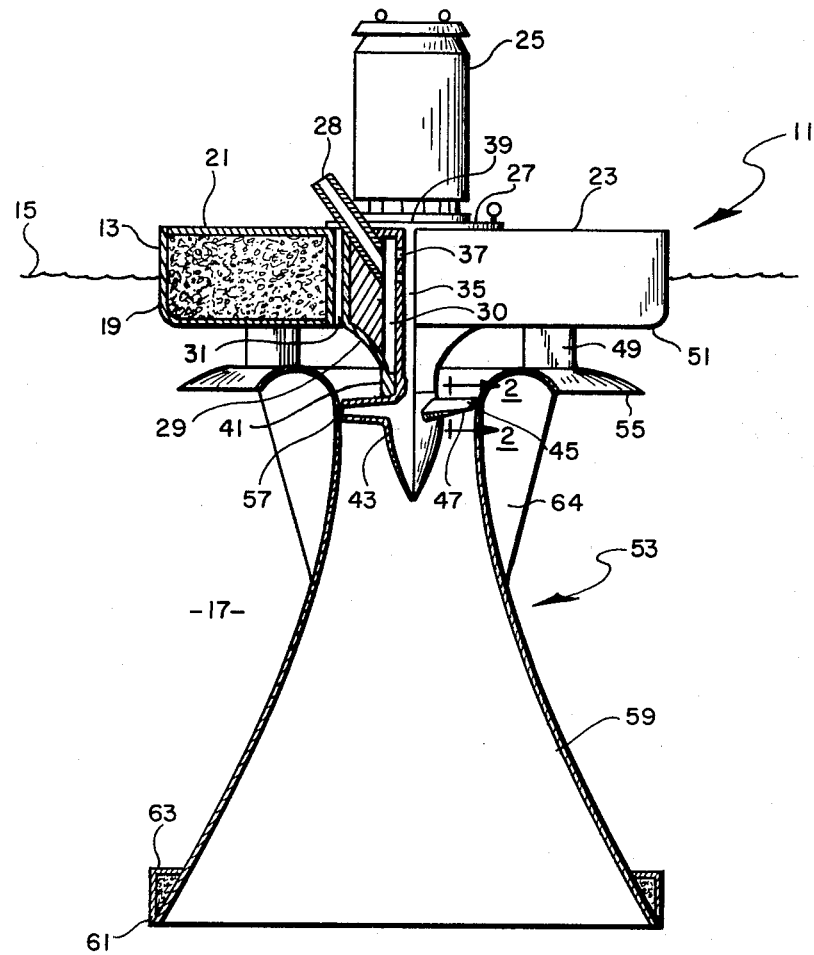
FIG. 1 is a side elevation, partially in section, of one embodiment of the apparatus of the invention.

Turning now to FIG. 1, there is seen the device 11 of the invention which is comprised of a float means 13 which will maintain the device at the surface 15 of a body of liquid 17. The float 13 can comprise a fiberglass shell 19 that has been filled with a low density polymeric foam 21. It should be apparent that virtually any suitable float material and construction can be utilized, or a more conventional fixed or movable bridge provided that will adequately support the overall device or devices at the surface of a body of liquid. The size of the float will, of course, be dependent upon the overall weight and dimensions of the remaining components.

Rigidly mounted on a top surface 23 of the float is a motor 25 which can preferably be an electric motor. The size of the motor is important to the herein invention. One of the main objectives to be achieved by the herein device and method is the maximization of the amount of oxygen dissolves per-horsepower-hour of energy expenditures. The interrelationship of the horsepower requirement for the motor to the remaining components of the device will become more apparent in the following description of the invention.

The motor 25 is situated on a support base 27 which in turn is rigidly secured to the top surface 23 of the float or support. The base 27 further serves to support a downwardly extending chamber or housing 29. Housing 29 is situated within an opening 31 provided in the float adjacent the base 27. A tube 28 leads from the atmosphere to an air plenum 30 extending vertically through the housing. Depending downwardly from the motor and concentrically within the plenum 30 is a hollow propeller shaft 35 operably connected to the motor to be rotated thereby. The shaft 35 has a plurality of openings 37 therein adjacent an upper end 39 adjacent the top surface 23 of the float. A bottom end 41 of the hollow shaft 35 is connected into a hollow propeller hub 43 having a plurality of radially extending blades 45. Air can thus enter through the tube 28 to the plenum 30 and then flow through openings 37 within the hollow propeller drive shaft 35. The air will then travel downwardly into the propeller hub 43.

Figure 2:
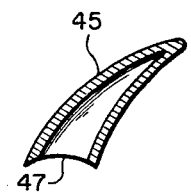
FIG. 2 is an enlarged cross-sectional view of one of the blades of the impeller, taken on the line 2—2 of FIG. 1.

The propeller blades 45 are hollow and radially extend from the hollow hub or plenum 43. The plenum in the hub assures an equal distribution of the air through the hollow blades 45. The blades 45, as particularly seen in FIG. 2, are preferably constructed so that there is a slit or opening 47 extending essentially along the entire trailing edge thereof whereby the air from the hollow hub 43 can leave or exit the blades. Moreover, the shape of the blades 45 is preferably proportioned to provide uniform distribution of air throughout the length of the blade. That is, the blades 45 are wider at the root than at the tip. Alternatively, if desired, one or more discrete individual openings may be provided in the surfaces of the blades 45 to permit passage of air therethrough. The advantage of having an entire opening or slit along the trailing edge of the blade 45, as compared to a plurality of discrete individual openings, is that the air can distribute itself evenly over the entire water flow area to achieve proper mass balance. The blade angles, which may be as shown having constant pitch from the hub to the tip of the blade, the hub diameter, and other design criteria, are based upon achieving supercavitation in the downward flow of the water. Additionally, the design considerations for the device, particularly the blade and hub area, are based on inducing a swirl into the water. In other words, the herein device is preferably designed so as to purposely induce swirl. It has been found that such swirling of the water prevents flow separation between the air-water mixture and the hereinafter-described diffuser 59, thereby precluding pressure loss and wastage of power. In other words, swirling stabilizes the flow through the flow area downstream of the propeller. The amount of swirl induced by the propeller should be sufficient to delay separation of the air-water mixture to the point where pumping power losses involved are acceptable. It is contemplated that some, but less than all, the blades may be hollow, as described above. Other blades may solely perform a water-pumping function and be solid, if desired.

A plurality of individual radially disposed support struts 49 depend downwardly from a bottom surface 51 of the float member 13. The support struts 49 are integrally affixed to the float and, in turn, are connected to an elongated venturi element 53. The element 53 has a radially extending curved lip portion 55 adjacent the support elements 49 at the top end of the element. From the radially extending lip portion 55, the element 53 is then constructed like a venturi so as to form an inner throat portion 57 essentially adjacent the blades 45. In other words, the element 53 converges inwardly from the lip portion 55 to a most narrow or throat portion 57 adjacent the blade area. Continuing from the blade area, the element then diverges outwardly into a venturi diffusion portion 59 which terminates at lower end 61 that preferably has a ballast means 63 thereabout. The ballast means 63 can be of any dense material such as metal or concrete, and serve to lower the center of gravity to stabilize the device. Obviously, where the device is mounted on a fixed bridge or other support means, the ballast means 63 may be omitted.

The elongated venturi element 53 is preferably thin-walled and formed of fiberglass or other suitable material. In order to provide necessary rigidity, a plurality of gussets 64 may be provided about the outer periphery adjacent the throat area 57.

Thus, it can be seen that water will enter the venturi element 53 by passing over a transition section formed by the curved lip portion 55 and is pulled into the throat area 57 by the suction created through the rotation of the blades 45 at the throat area. As has been indicated throughout, the herein device is preferably operated at supercavitation conditions. At such condition, a low pressure area is formed at the rear of each blade or, in other words, comes off the rear of each blade lateral to the liquid flow. Another way of stating the condition is that there is a single continuous vapor space entirely filled with an equal proportion of air and water vapor at the rear of each blade. Because of the low pressure region, air is aspirated out of the blade hub through the blades; means other than supercavitation, however, could be provided to cause air to flow out the blades. The blades are so constructed and the rate of rotation is such that the air is sheared to produce initial bubble sizes in the range of preferably 0.010 to 0.050 inch diameter. The plurality of bubbles is formed by the shear action between air and water flows and the vortex action of the water-gas mixture exiting the propeller area. The device is designed so that the size of the bubbles within the aforegoing range maximize the amount of air that will go into solution in the water, since it is well known that the bubble size directly affects such rate of solution.

The contouring of the diffusion section 59 of the entire venturi element 53 from the throat area 57 to the end 61 is such that it will prevent flow separation of the air-liquid mixture. Thus, the diffusion section 59 preferably has a divergence of about 60°, whereas classical divergers have divergence of only about 7°. As has been indicated above, flow separation at the wall of the diffuser is inhibited by purposely inducing a swirl into the liquid at the blade region. Further, the contour of the section 59, together with its overall length, may be established so as to recover most of the power loss generated at the blade region. In other words, the element is preferably designed so that up to 85 percent of the pressure is recovered at end 61. This considerably lowers the overall power requirements or, alternatively, serves to maximize the effective use of the power supplied. For example, if the section 59 is too short, then at its end 61 there would be significantly less recuperation of the pressure head or, alternatively, of the power input. If such were the case, then more power would be required to achieve equal results and the efficiency of oxygen transfer would be reduced.

In addition to the foregoing, the length of the diffusion section 59 may be controlled so that a significant part of the air has gone into solution by the time it exits from end 61. This will serve to prevent the air from rising as bubbles and coming back into the inlet of the venturi 57 over lip 55. Thus, once again if the diffusion section 59 is too short and a significant portion of the air has not gone into solution by the time it exits the device, then it could readily go back into the system, serving to minimize the effect of the device and, of course, seriously altering the design characteristics which are based upon only water passing over lip portion 55 to the venturi section and the air coming only through the hollow shaft 35. On the other hand, the diffuser should not be so long that the air coalesces before leaving the diffuser (i.e., the liquid exit speed should exceed the bubble rise velocity). Alternatively, the velocity of the blades 45 may be regulated to control depth and rate of flow of the bubbles. When this is done, the diffusion section 59 may be omitted.

Figure 3:
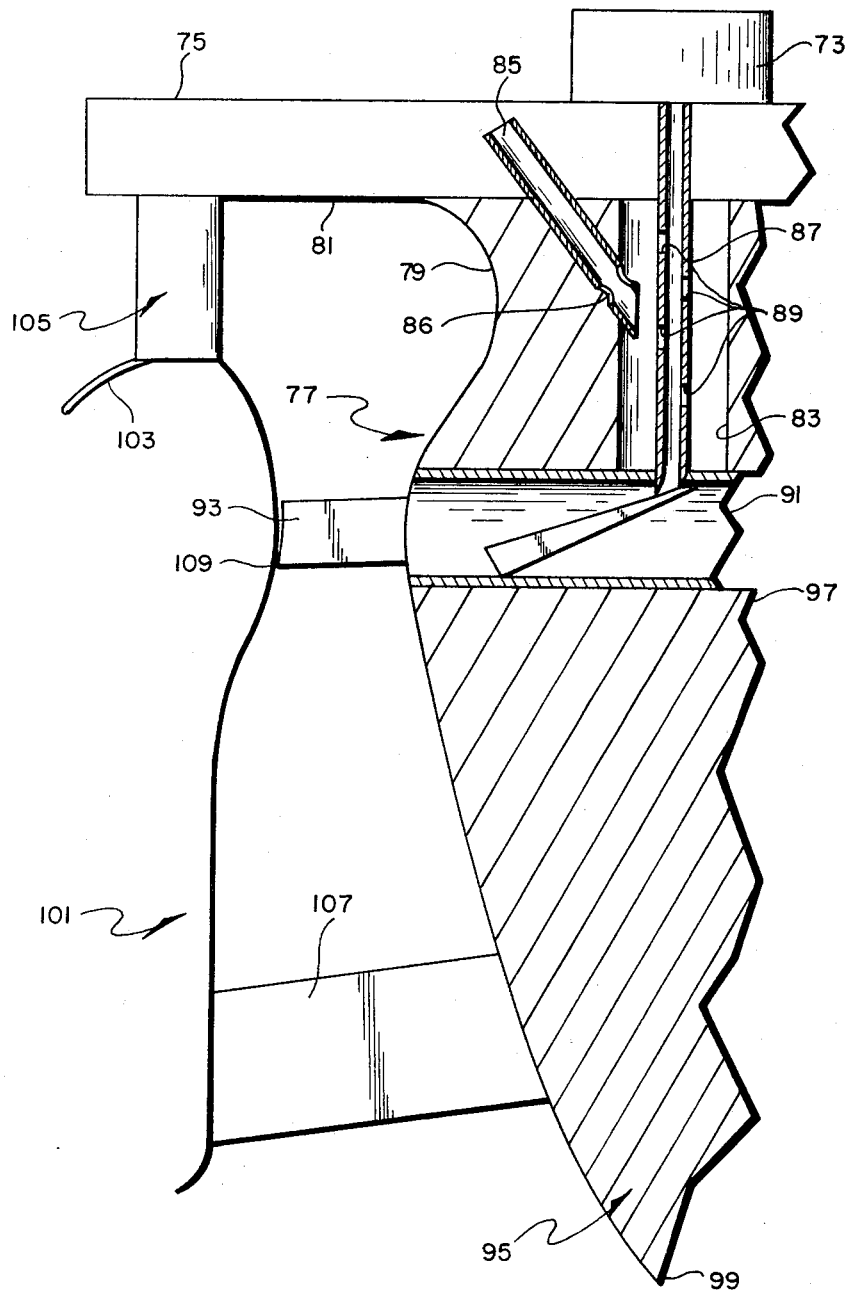
FIG. 3 is a side elevation, partially in section, of another embodiment of the apparatus of the invention.

A second embodiment of the invention is seen in FIG. 3, which utilizes the same novel principle of operation as the first embodiment. In this embodiment, the device 71 can comprise a motor 73 disposed on a float 75 in the same manner as previously described. However, in this embodiment, there is a large elongated counterbody 77 extending downwardly from the float 75. The centerbody is divided into three sections. A first section 79 is connected to a lower surface 81 of the float. The secton 79 has an elongated central vertical opening 83. A gas inlet line 85, having a first venturi 86 formed therein, intersects the opening 83 which serves as a plenum chamber. A hollow drive shaft 87 extends downwardly from the motor 73 being concentrically disposed within the opening 83. The shaft has a plurality of apertures 89 therein for allowing the gas from the plenum to enter in the same manner as described in the embodiment of FIG. 1.

Disposed below the first section 79 is a second section 91 which is a hub for hollow rotor blades 93. The hub 91 is hollow, serving as a plenum for the gas prior to its leaving the blades. The blades are constructed in the same manner as described in FIG. 1, with an opening along the trailing edge thereof. The hub and blades are rotated by the drive shaft 87.

Extending downwardly from the hub section 91 is a third, stationary, section 95 which has an enlarged upper end 97 adjacent the hub 91 and which tapers substantially conically to a very narrow downward end 99. In other words, the diameter of the third section decreases from upper end 97 to lower end 99.

Surrounding the centerbody 77 is a wall 101. A radial lip portion 103 is formed on the wall at its upper end. A plurality of struts 105 connect the wall 101 to the float 75 at the lip portion 103. Additionally, a plurality of other struts 107 connect the third section 95 of the centerbody to the wall. Thus, the wall is supported downwardly from the float, while the separate non-rotating third section 95 is supported by the wall relative to the overall centerbody.

The wall 101 has essentially a constant outer diameter except for a reduced portion 109 adjacent the blades 93. At this same point, it is to be seen that the centerbody has its widest diameter which constitutes the hub 91. Thus, a constricted throat portion of a venturi is provided adjacent to the blades. Thus, effectively, a venturi is provided, as in the first embodiment described. However, in this embodiment, the centerbody is contoured as compared to the diffuser wall of the first embodiment. At inlet convergent portion of the wall is provided, formed between the lip port 103 of the wall and first section 79, and a divergent outer portion of the venturi is provided between the wall and the third section 95 of the centerbody. In this embodiment, the liquid-gas mixture diffuses inwardly toward the centerbody as it leaves the blades, as compared to the first embodiment where the mixture diffuses outwardly.

The main advantage of this second embodiment is that significantly shorter blades can be used. As a result, one can operate the device at lower rotor speeds yet still achieve supercavitation. As a result, there is less friction loss at the blades and the efficiency is increased.

I claim:

1. In an aeration device having an axial flow impeller disposed to rotate below the surface of a liquid body, the improvement comprising:
   a. an impeller, including a plurality of radially extending propeller blades, at least some of which are hollow, said hollow blades having at least one opening formed therein to permit passage of gas into said liquid from the interior of said hollow blades;
   b. means communicating with the interior of said hollow blades wherefrom the gas flows out the openings in said blades as said blades rotate to impel liquid;
   c. a vertically disposed venturi arranged to surround the impeller with the throat of said venturi adjacent said blades so that said blades impel a downward flow of liquid in the lower expanding portion of said venturi, said venturi having an inlet end disposed above said blades, said inlet end having a radially extending lip which curves inwardly and downwardly to said throat portion adjacent said blades; and
   d. float means which support said venturi from above, said float means having a smoothly curved bottom which is spaced above said inlet end of said venturi and which cooperates with said lip to form a smooth course for liquid into said inlet end.

2. The improvement of claim 1 including means coupled to said impeller to rotatably drive it at a speed sufficient to produce supercavitation at said blades thereby aspirating the gas out the openings in said blades.

3. The improvement of claim 2 wherein said coupling includes a tubular shaft and said shaft has at least one opening in its wall for admitting air into said hollow blades.

4. The device of claim 3 including a hollow hub member from which said blades radially extend and from which the air passing from said passageway in said shaft enters said hollow blades.

5. The improvement of claim 1 wherein said blades are arranged to produce supercavitation thereon.

6. The improvement of claim 1, wherein said lower expanding portion of said venturi comprises a continuous wall which is circular in cross-section and which expands outwardly and downwardly from a narrow throat portion adjacent said blades to an outlet end.

7. The improvement of claim 6 wherein said lower expanding portion of said venturi has a length such that the fluid velocity at said outlet end is greater than the velocity at which bubbles tend to rise.

8. The improvement of claim 6 wherein said venturi has lower expanding portion having a divergence of approximately sixty degrees.

9. The improvement of claim 6 wherein said impeller is adapted to impart swirl to the liquid to substantially prevent flow separation between the air-water mixture and the wall of said lower expanding portion of said venturi.

10. The improvement of claim 6 wherein said lower expanding portion of said venturi extends downward sufficiently to recapture, at its lower open end, the fluid pressure head generated by the impeller.

11. The improvement of claim 10 wherein said lower expanding portion has a divergence angle of the order of about 60°.

12. The improvement of claim 1 wherein said shaft includes a constriction fitted thereinto for restricting the flow of air.

13. The improvement of claim 10 wherein said constriction has the form of a venturi nozzle.

14. The device of claim 1 wherein said blades are arranged at an appropriate pitch to induce a swirl in the liquid downstream from said impeller.

15. The improvement of claim 1 wherein the blades are proportioned to provide uniform distribution of air throughout the length of the blades.

* * * * *